No. 867,236. PATENTED OCT. 1, 1907.
W. H. BLOOD, Jr.
PIPE CAP.
APPLICATION FILED JAN. 19, 1907.
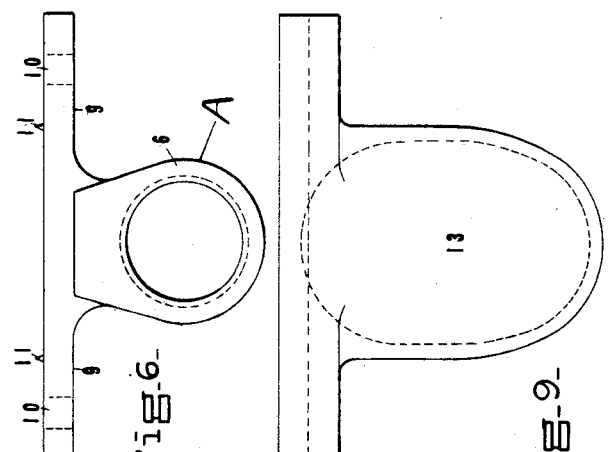
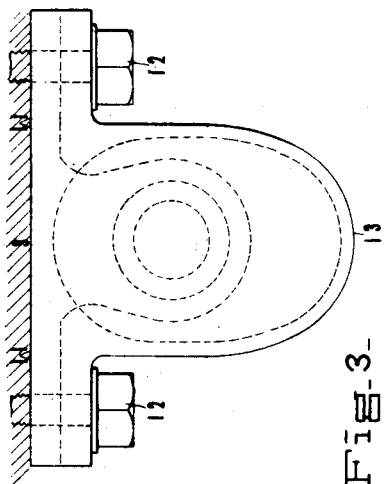
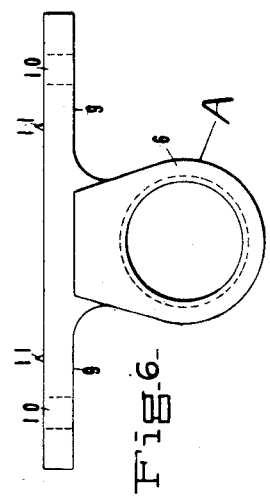
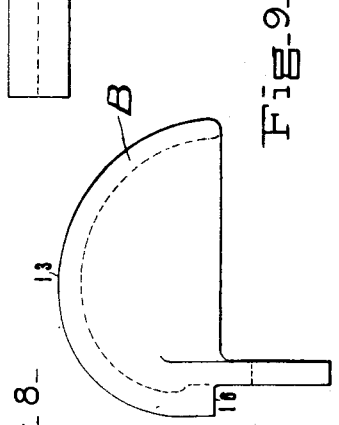
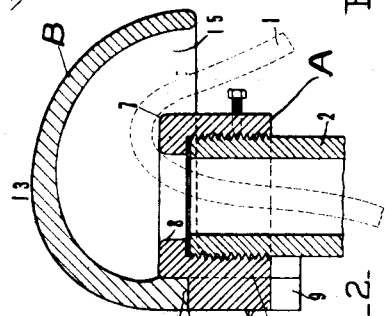
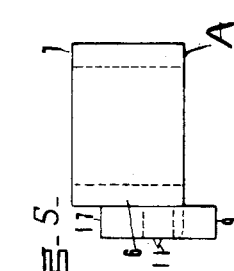
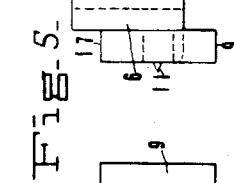
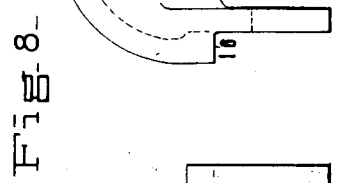
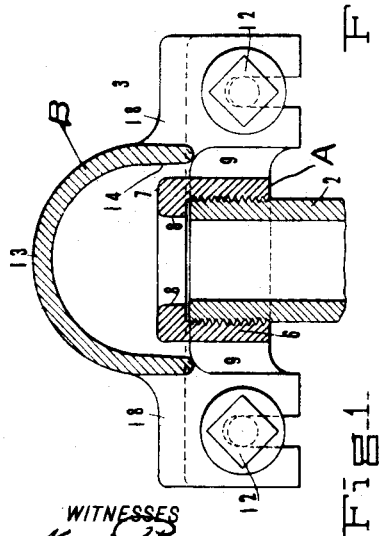
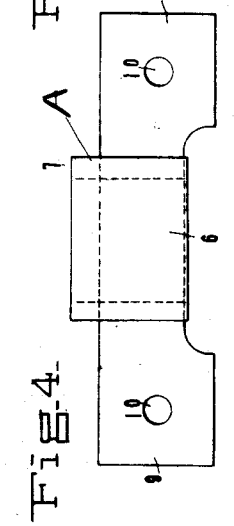
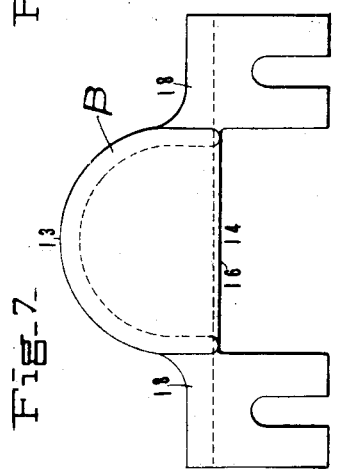
WITNESSES
INVENTOR
W. H. Blood Jr.
BY
ATTORNEY

UNITED STATES PATENT OFFICE.

WILLIAM HENRY BLOOD, JR., OF WELLESLEY, MASSACHUSETTS.

PIPE-CAP.

No. 867,236.  Specification of Letters Patent.  Patented Oct. 1, 1907.

Application filed January 19, 1907. Serial No. 353,012.

*To all whom it may concern:*

Be it known that I, WILLIAM HENRY BLOOD, Jr., residing at Wellesley, in the county of Norfolk and State of Massachusetts, have invented certain new and useful Improvements in Pipe-Caps, of which the following is a full, clear, and exact description, such as will enable others skilled in the art to which it appertains to make and use the same.

This invention relates broadly to improvements in appliances adapted to be affixed to the end of a cable conduit to secure the latter to an adjacent wall or pole and prevent the admission of water into its open end although concomitantly providing a satisfactory egress for the cables or wire contained within the conduit. Since, however, certain of the peculiar advantages characteristic of this invention prominently appear in the herein illustrated specific application, it will be conducive to clearness to disclose it through such embodiment.

This invention has for an object to provide a multipart appliance of the foregoing nature comprising mainly a webless annular collar capable of being initially fastened to both the end of a conduit and to an adjacent supporting wall or poll, and also a hood which in turn is adapted for being subsequently secured to the collar with ease and despatch and without necessitating the difficult operation of inserting in inaccessible places screws or other connections which are likely to slip from the fingers and otherwise cause vexatious delays.

Still another object is to so arrange and form the collar that it will have a rounded narrow upper edge for permitting the bending of the cables without abrasion and which will also provide an uninterrupted space between the outermost portions of said collar and the lower rim of the surmounting hood.

A further object is to provide the said collar with spurs adapted to engage the adjacent supporting wall or pole and also with suitable ears having orifices for receiving attaching bolts or screws for rigidly securing it to the wall or pole.

Another object is to so devise and form the hood that it will detachably interfit and contact with the rear portion only of the collar and be entirely free from the front part thereof so as to provide an uninterrupted space between the hood and such forward part of the collar.

Another object is to provide the hood with lugs adapted to detachably interlock with certain portions of said collar, together with means whereby said parts will be secured against disengagement.

More specifically, another object is to provide the hood with portions or bifurcated lugs so arranged as to be very readily slipped over the shanks of the bolts, which in turn secure the collar against the wall or pole so that upon tightening said bolts the hood will be simultaneously secured against disengagement from the collar.

Other objects and advantages will be in part obvious and in part pointed out hereinafter.

This invention in general seeks to provide a means of the class described which from an electrical standpoint will in practical usage possess a higher degree of efficiency and effectiveness and which structurally considered will be of the greatest possible simplicity and be composed of but few parts each capable of being formed at a minimum of cost and so correlated as to be capable of being very readily assembled by any person skilled in the art to accomplish the purposes intended.

The invention accordingly consists in the features of construction, combinations of elements and arrangement of parts which will be exemplified in the construction hereinafter set forth, and the scope of the application of which will be indicated in the following claims.

In order that this invention may be fully understood and made comprehensible to others skilled in its relating arts, drawings illustrating one of the various applications of the same are appended as a part of this specification, and, while the controlling principles of the invention may be otherwise applied by modifications falling within the scope of the claims, the herein disclosed embodiment is that which will ordinarily be resorted to in practice and which is regarded as representing substantial improvements over the many obvious and implied variations of the same.

In the appended drawings corresponding parts are similarly referred to by like characters of reference throughout all the figures, of which Figure 1 is a front sectional elevation showing the parts assembled and showing the general relationship therebetween; Fig. 2 is a side sectional elevation, or in other words a vertical medial section taken transversely through Fig. 1, showing the arrangement of certain parts not clearly apparent from Fig. 1; Fig. 3 is a top plan view of the device shown with the parts assembled; Fig. 4 is a front elevation of the webless collar disassociated from the hood; Fig. 5 is a side elevation of the disassociated webless collar; Fig. 6 is a top plan view of the same; Fig. 7 is a front elevation of the hood alone; Fig. 8 is a side elevation of the hood alone; and Fig. 9 is a top plan view of the hood alone.

Inasmuch as it is desirable to protect them from weathering and against mechanical injury, cables such as I have denoted in Fig. 2 by 1 are generally housed or shielded by means of a conduit 2 which ordinarily will consist of metal or other suitable material. Such conduits lead into the building or connect with underground conduits and generally have their exposed ends arranged upright and adjacent a supporting wall or pole indicated by 3 in Fig. 3. As the upper ends of such conduits would otherwise receive the water or dirt, it is customary to shield them by means of a suitable appliance, and the latter is usually affixed by the workman after the course of the conduit has been determined. In carrying out my invention I provide a webless annular collar A which is preferably interiorly threaded at 6, or provided with a set-screw adapting it for being very easily engaged with the extreme end of the conduit. The upper rim 7 of the annular collar I round and also shoulder at 8 so as to provide a bore which is here shown substantially flush with the inner wall of the conduit, in order that the cable may pass thereover without any liability of abrasion. Such collar is at or towards its rear provided with laterally extending ears 9 which are orificed at 10 for the passage of bolts and which may also be provided with spurs 11 for additionally securing the same to the wall of the building. This very simple and easily made collar can be secured to the conduit end with the greatest of facility by merely screwing the same thereonto. The ears are then placed against the supporting wall or pole and the retaining bolts or screws 12 are inserted but not driven or screwed entirely home until the hood B is put in place, when, because of the peculiar correlationship of the interfitting parts, the final driving or screwing of the retaining bolts will simultaneously bind together the hood and the webless collar.

The hood B simply consists of a dome 13 of suitable contour and preferably somewhat elongated so as to entirely clear the collar at the sides, as shown by 14, and at the front, as shown by 15. A very considerable advantage accrues to this arrangement inasmuch as a free space of considerable size is provided at 15 for the egress of the cables, and at the same time by having the hood appreciably distanced from the collar at the sides, the flow of water from the hood to the collar along an intervening web or body portion (which the herein shown specific embodiment of this invention does not have) is entirely prevented and all the water will drip from the lower edges of the hood. At the rear the hood is provided with a horizontal or angular shoulder 16 which is adapted to abut a complementary ledge 17 on the rear of the collar, so that when placing the hood over the latter it will be a simple matter to at once obtain the proper relative positioning of the two. The hood, furthermore, is provided with laterally extending lugs 18 which are complementary to the ears of the collar and which preferably, as shown, are each bifurcated and adapted for being conveniently slipped over the shanks of the retaining bolts 12, so that upon tightening the latter all the parts will be simultaneously secured together.

It will be readily appreciated that the assemblage of the parts is capable of being carried out with the utmost facility, and that the securing of the hood to the ears of the annular collar does not involve the use of small screws or other attaching means which are so likely to become lost during the operation.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It is also to be understood that the language used in the following claims is intended to cover all of the generic and specific features of the invention herein described and all statements of the scope of the invention which, as a matter of language, might be said to fall therebetween.

Having described my invention, what I claim as new and desire to secure by Letters Patent is:

1. A device of the class described comprising in combination an upright conduit, an annular collar attached to the end thereof, a hood overlying said collar, and means for simultaneously securing the hood to said collar and the latter to a support.

2. A device of the class described comprising in combination an upright conduit, an annular collar in interfitting engagement with the end of said conduit, said collar having an ear provided with an orifice for securing said collar to a support, and a detachable hood overlying said collar and having its lower rim spaced away from the opposite portions of the collar whereby an uninterrupted space between said parts is provided, said hood having a lug provided with an orifice adapted to be brought into alinement with the orifice in said ear.

3. A device of the class described comprising in combination an annular collar adapted to be engaged in interfitting relation with a cable conduit, said collar having a rounded upper edge and being provided at its rear with ears whereby it may be secured to a support, and a hood surmounting said collar and secured to the latter at its rear by means of laterally extending lugs, the front rim of said hood being spaced away and entirely free from said collar or extensions thereof and being below the upper rounded edge thereof.

4. A device of the class described comprising in combination a collar adapted to be secured to a cable conduit and at its rear providing one or more orificed ears adapted to receive screws for securing the same to a support, and a surmounting hood having one or more extensions adapted to be engaged by said screws, whereby upon tightening said screws the hood and collar will be affixed together and secured to the support.

5. A device of the class described comprising in combination a collar adapted to be secured to the extreme end of a cable conduit and having one or more laterally extending ears provided with orifices adapted to receive screws passing through said orifices and into an adjacent support, and a hood surmounting said collar and having one or more bifurcated lugs adapted to straddle the shanks of said screws and be thereby positioned against displacement upon tightening said screws.

In testimony whereof I affix my signature, in the presence of two witnesses.

WILLIAM HENRY BLOOD, Jr.

Witnesses:
  NATHAN H. DANIELS, Jr.,
  ALICE D. TALLOW.